(12) United States Patent
Fludger et al.

(10) Patent No.: US 9,935,720 B2
(45) Date of Patent: Apr. 3, 2018

(54) CONTROL OF LO SIGNAL FREQUENCY OFFSET BETWEEN OPTICAL TRANSMITTERS AND RECEIVERS

(71) Applicant: Cisco Technology, Inc., San Jose, CA (US)

(72) Inventors: Christopher Fludger, Nuremberg (DE); Thomas Duthel, Nuremberg (DE); Joerg Leykauf, Heroldsbach (DE); Karsten Michaelsen, Eckental (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/644,084

(22) Filed: Jul. 7, 2017

(65) Prior Publication Data

US 2017/0310401 A1 Oct. 26, 2017

Related U.S. Application Data

(62) Division of application No. 14/921,222, filed on Oct. 23, 2015, now Pat. No. 9,735,888.

(51) Int. Cl.
*H04B 10/61* (2013.01)
*H04B 10/532* (2013.01)
(Continued)

(52) U.S. Cl.
CPC ..... *H04B 10/6164* (2013.01); *H04B 10/5161* (2013.01); *H04B 10/532* (2013.01); *H04B 10/5561* (2013.01); *H04L 27/00* (2013.01)

(58) Field of Classification Search
CPC ............ H04B 10/6164; H04B 10/5561; H04B 10/5161; H04B 10/532; H04L 27/00
See application file for complete search history.

(56) References Cited

U.S. PATENT DOCUMENTS 5,584,068 A * 12/1996 Mohindra ................. H03J 7/02
375/344
9,735,888 B2 * 8/2017 Fludger .............. H04B 10/6164
(Continued)

OTHER PUBLICATIONS

E. Pincemin et al., "Novel Blind Equalizer for Coherent DP-BPSK Transmission Systems: Theory and Experiment", IEEE Photonics Technology Letters, vol. 25, No. 18, Sep. 15, 2013, pp. 1835-1838.
(Continued)

*Primary Examiner* — Danny Leung
(74) *Attorney, Agent, or Firm* — Edell, Shapiro & Finnan, LLC

(57) ABSTRACT

A system includes a laser configured to generate a tunable optical frequency. The system also includes an optical transmitter to map baseband data to symbols represented in a digital modulation constellation, add a frequency offset to the digital modulation constellation to cause the digital modulation constellation to rotate at a rate equal to the added frequency offset, modulate the optical frequency with the rotating digital modulation constellation, and transmit the resulting modulated optical frequency. The system also includes an optical receiver to receive the transmitted modulated optical frequency and, using the tunable optical frequency, detect the rotating digital modulation constellation conveyed by the received modulated optical frequency.

20 Claims, 10 Drawing Sheets

(51) Int. Cl.
*H04L 27/00* (2006.01)
*H04B 10/516* (2013.01)
*H04B 10/556* (2013.01)

(56) References Cited

U.S. PATENT DOCUMENTS

| | | | | |
|---|---|---|---|---|
| 2007/0036555 A1* | 2/2007 | Chen | H04B 10/6165 | 398/188 |
| 2008/0298453 A1* | 12/2008 | Lerner | H04L 25/03019 | 375/233 |
| 2009/0092197 A1* | 4/2009 | Okamoto | H04L 27/2657 | 375/260 |
| 2010/0232805 A1* | 9/2010 | Cai | H04B 10/61 | 398/158 |
| 2015/0303991 A1* | 10/2015 | Dehmas | H04B 1/7183 | 375/130 |
| 2017/0117969 A1* | 4/2017 | Fludger | H04B 10/6164 | |
| 2017/0310401 A1* | 10/2017 | Fludger | H04B 10/6164 | |

OTHER PUBLICATIONS

T. Zeng et al., "The Manipulated Rotating BPSK Technique Compatible with Conventional CMA Algorithm", Optical Fiber Communication Conference, Los Angeles, CA, Mar. 22-26, 2015, ISBN: 978-1-55752-937-4, 3 pages.

* cited by examiner

CONTROL OF LO SIGNAL FREQUENCY OFFSET BETWEEN OPTICAL TRANSMITTERS AND RECEIVERS

CROSS-REFERENCE TO RELATED APPLICATIONS

This application is a divisional application of U.S. application Ser. No. 14/921,222, filed Oct. 23, 2015, which is incorporated herein by reference in its entirety.

TECHNICAL FIELD

The present disclosure relates to optical communications.

BACKGROUND

An optical transmitter may employ digital modulation to modulate transmitter laser light (i.e., an optical signal), to produce modulated laser light. In an example, digital modulation in the form of dual-polarization binary phase shift keying (DP-BPSK) modulates the laser light only on one axis, compared with other types of digital modulation, such as quadrature phase shift keying (QPSK) and 16 quadrature amplitude modulation (16QAM), which modulate the transmitter laser light onto orthogonal axes. An optical receiver demodulates the modulated laser light based on receiver laser light. Ideally, there is a non-zero frequency offset between the transmitter laser light and the receiver laser light, which improves demodulation. In practice, however, there may be zero or near-zero frequency offsets between the transmitter and receiver laser light. This occurs when the optical transmitter and receiver use different lasers that happen to generate laser light at the same frequency by chance or when the optical transmitter and receiver share a common laser.

To demodulate the modulated optical laser light, the optical receiver detects in-phase (I) and quadrature (Q) signals conveyed by the modulated optical laser light based on the receiver laser light. The above mentioned zero or near-zero frequency offsets cause energy fading in the I and Q signals, which hampers the demodulation process. For example, the fading perturbs automatic gain control loops used to control photo-detectors that detect the I and Q signals. The fading also complicates polarization tracking in cases where a constant modulus equalization algorithm is used. The fading is exacerbated by DP-BPSK modulation, which already limits energy to only one axis (either I or Q).

DESCRIPTION OF EXAMPLE EMBODIMENTS

Overview

A system includes a laser configured to generate a tunable optical frequency. The system also includes an optical transmitter to map baseband data to symbols represented in a digital modulation constellation, add a frequency offset to the digital modulation constellation to cause the digital modulation constellation to rotate at a rate equal to the added frequency offset, modulate the optical frequency with the rotating digital modulation constellation, and transmit the resulting modulated optical frequency. The system also includes an optical receiver to receive the transmitted modulated optical frequency and, using the tunable optical frequency, detect the rotating digital modulation constellation conveyed by the received modulated optical frequency.

Example Embodiments

Figure 1:
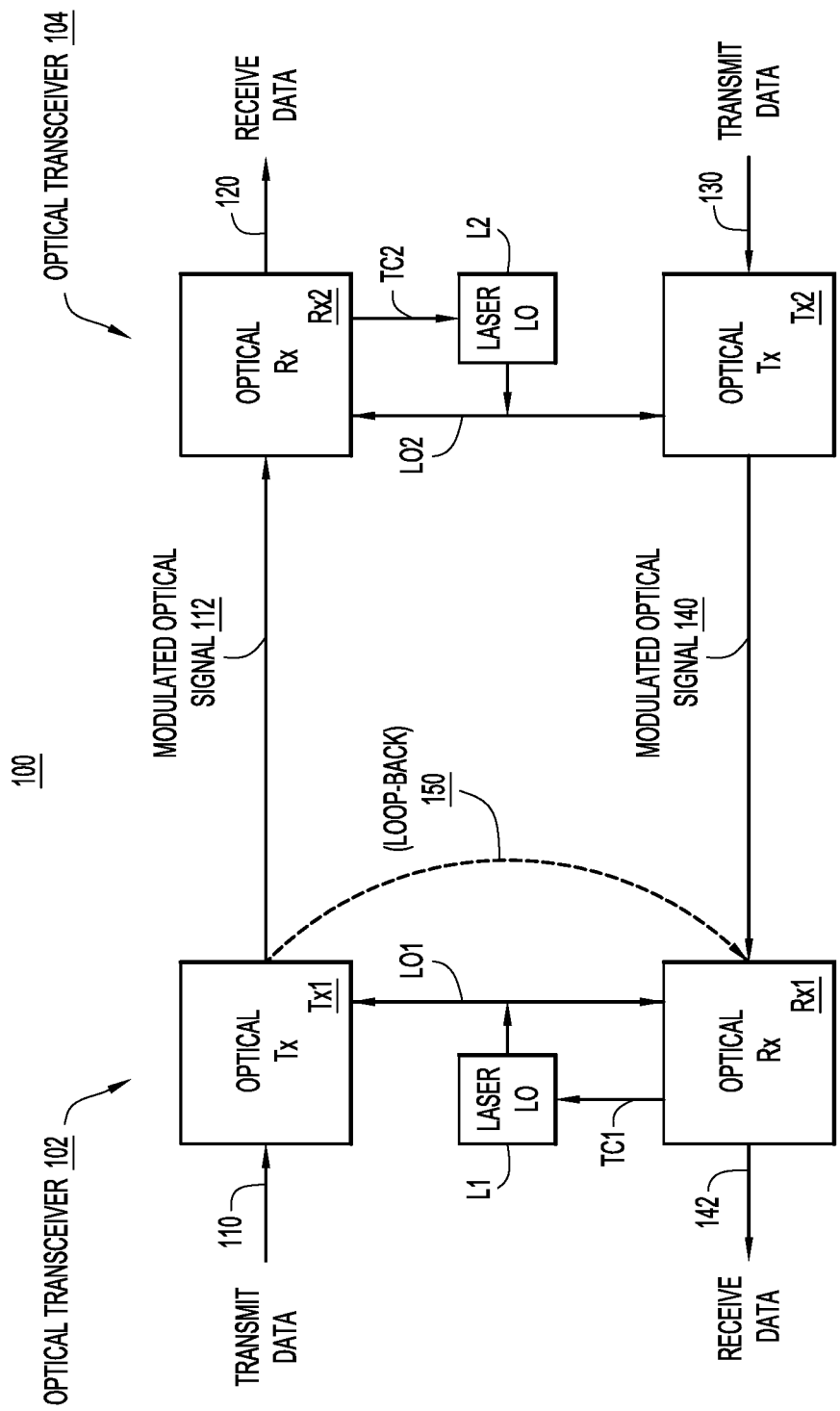
FIG. 1 is a block diagram of an optical communication system, according to an example embodiment.

Referring to FIG. 1, there is shown a block diagram of an example optical communication system 100 including a first optical transmitter/receiver ("transceiver") 102 and a second optical transceiver 104 that exchange optical signals with each other over an optical medium such as free-space and/or an optical fiber (not specifically shown in FIG. 1). Optical transceiver 102 includes an optical transmitter (TX) TX1, an optical receiver (RX) RX1, and a frequency tunable laser L1 to provide a laser signal LO1 (also referred to as an "optical signal LO1") to optical transmitter TX1 and optical receiver RX1. In the example of FIG. 1, optical signal LO1 is used both as an optical carrier for modulation in optical transmitter TX1 and as a local oscillator (LO) signal in optical receiver RX1; however, in another example, separate laser signals may be used in the optical transmitter and the optical receiver. Similarly, optical transceiver 104 includes an optical transmitter TX2, an optical receiver RX2, and a frequency tunable laser L2 to provide a laser signal LO2 (also referred to as "an optical signal LO2") to optical transmitter TX2 and optical receiver RX2. In the example of FIG. 1, optical signal LO 2 is used both as an optical carrier for modulation in optical transmitter TX2 and as an LO signal in optical receiver RX2; however, in another example, separate laser signals may be used in the optical transmitter and the optical receiver. In an example, optical signals LO1 and LO2 have respective first and second (center) optical frequencies near 193.1 THz+/−1.5 GHz, although other optical frequencies are possible.

Moving left-to-right in FIG. 1, optical transmitter TX1 receives transmit data 110 having a frequency spectrum centered at 0 Hz, i.e., baseband. Optical transmitter TX1 modulates laser signal LO1 with baseband transmit data 110 to produce a modulated optical signal 112. Optical transmitter TX1 transmits modulated optical signal 112 over the optical medium. In an example, optical transmitter TX1 modulates laser signal LO1 with transmit data 110 using any known or hereafter developed type of digital modulation, including binary phase shift keying (BPSK), dual-polarization (DP) BPSK (DP-BPSK), quadrature phase shift keying (QPSK), quadrature-amplitude modulation (QAM), or the like.

Optical receiver RX2 receives modulated optical signal 112, and uses optical signal LO2 as a local oscillator signal to demodulate the modulated optical signal so as to recover receive data 120 therefrom, where the receive data is representative of transmit data 110. Ideally, the first and second optical frequencies of optical signals LO1 and LO2 are different, i.e., there is a non-zero LO-signal frequency offset between the first and second optical frequencies, so that optical transmitter TX1 and optical receiver RX2 perform their respective modulation and demodulation operations based on the different first and second optical frequencies. Such an LO-signal frequency offset (also referred to simply as a "frequency offset") advantageously spreads average energy of modulated optical signal 112 across multiple photo-detectors in optical receiver RX2 that detect the energy used to demodulate the (received) modulated optical signal. If left to chance, the first and second frequencies may be the same, i.e., there may be no LO-signal frequency offset between the first and second frequencies, which complicates demodulation in optical receiver RX2.

According to a first embodiment presented herein (also referred to as a "receiver implemented" embodiment), optical receiver RX2 tunes the frequency of optical signal LO2 relative to the frequency of optical signal LO1 while the optical receiver demodulates (received) modulated optical signal 112, so as to impose a non-zero LO-signal frequency offset (e.g., an LO-signal frequency offset near 800 MHz) between the frequencies of optical signals LO1 and LO2. To do this, optical receiver RX2 derives an LO frequency control signal TC2 that tunes the frequency of optical signal LO2, so as to drive the LO-signal frequency offset between the frequencies of optical signals LO1 (which is associated with the optical transmitter TX1) and LO2 (which is associated with the optical receiver RX2) toward one of multiple non-overlapping, non-zero target windows of LO-signal frequency offset. Control signal TC2 may drive an operating bias current supplied to laser L2 to tune its frequency, or drive a current that controls a temperature of laser L2 to tune its frequency.

Optical transmitter TX2 and RX1 are configured and operate similarly to optical transmitter TX1 and optical receiver RX2, respectively. Thus optical transmitter TX2 modulates optical signal LO2 with baseband transmit data 130 to produce a modulated optical signal 140, and transmits the modulated optical signal over the optical medium. Optical receiver RX1 receives modulated optical signal 140, and demodulates it using optical signal LO1 as a local oscillator signal to recover receive data 142 representative of transmit data 130. While optical receiver RX1 processes (received) modulated optical signal 140, the optical receiver may tune the frequency of optical signal LO1 relative to the frequency of optical signal LO2 (associated with optical transmitter TX2) using an LO frequency control signal TC1 to ensure a sufficient non-zero LO-signal frequency offset between the frequencies of optical signals LO1 and LO2.

In the example of FIG. 1, laser L1 provides signal LO1 to both optical transmitter TX1 and optical receiver RX1, and laser L2 provides signal LO2 to both optical transmitter TX2 and RX2. In an alternative example mentioned above, different lasers may drive the signals to optical transmitter TX1 and optical receiver RX1, and different lasers may drive the signals to optical transmitter TX2 and optical receiver RX2. The example of FIG. 1 and the alternative example may each employ the above-described receiver implemented embodiment to tune the frequency of the optical signal (e.g., LO1 or LO2) at the optical receiver so as to introduce a non-zero LO-signal frequency offset between the optical signal at the optical receiver data and the received modulated signal from the optical transmitter.

Optical transceivers 102 and 104 may also each operate in a loop-back arrangement. In the loop-back arrangement, an optical output of an optical transmitter of a given optical transceiver is supplied to an optical input of that optical transceiver. Such a configuration is depicted at dotted-line 150 in FIG. 1. Dotted-line 150 represents a loop-back connection from an optical output of optical transmitter TX1 to an optical input of optical receiver RX1, such that optical transmitter TX1 transmits modulated optical signal 112 and optical receiver RX1 receives that same signal. The loop-back arrangement may be useful for testing a given optical transceiver, e.g., optical transceiver 102. In the loop-back arrangement of FIG. 1, optical transmitter TX1 and optical receiver RX1 share optical signal LO1. Thus, optical transmitter TX1 performs modulation operations and optical receiver RX1 performs demodulation operations using the same optical signal, i.e., optical signal LO1. That is, the laser (i.e., optical) frequency used to modulate in optical transmitter TX1 is the same as that of the local oscillator used to demodulate in optical receiver RX1, which can complicate demodulation in the optical receiver.

In the loop-back arrangement, tuning the frequency of the optical signal (e.g., LO1 or LO2) at the optical receiver as described above does not achieve the desired LO-signal frequency offset because the optical transmitter and the optical receiver use the same optical signal. Accordingly, a second embodiment associated with the loop-back arrangement (also referred to as the "loop-back" embodiment) is used to ensure that a sufficient LO-signal frequency offset exists in loop-back. Briefly, the optical transmitter (e.g., optical transmitter TX1) incorporates a small, digitally implemented frequency offset (e.g., approximately 7 or 8 MHz) into the modulated optical signal (e.g., modulated optical signal 112), which is detected in the looped-back optical receiver (e.g., optical receiver RX1), as will be described more fully below. The small frequency offset need only be larger than a control bandwidth of gain control loops of the optical receiver, which are typically on the order of 500 KHz. In the loop-back embodiment, the optical transmitter (e.g., TX1 or TX2) may add the small frequency offset only when the optical transmitter is configured for loop-back with the corresponding optical receiver (e.g., RX1 or RX2). Alternatively, the optical transmitter (e.g., TX1 or TX2) may always add the small frequency offset, even when not in loop-back, so that there is no need for a special configuration just for loop-back.

Figure 2C:
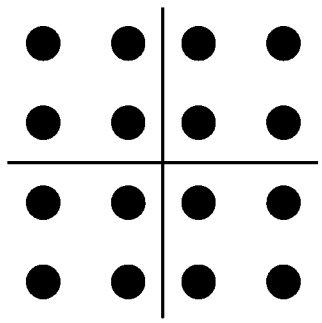
FIG. 2C is a digital modulation constellation for quadrature amplitude modulation (QAM) produced by the optical transmitter, according to an example embodiment.
Figure 2B:
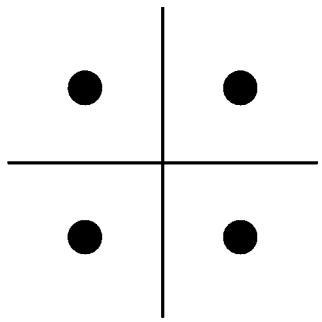
FIG. 2B is a digital modulation constellation for quadrature phase shift keying (QPSK) produced by the optical transmitter, according to an example embodiment.
Figure 2A:
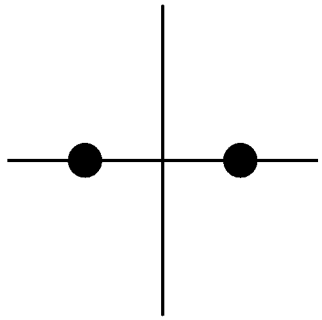
FIG. 2A is a digital modulation constellation for binary phase shift keying (BPSK) produced by an optical transmitter in the system of FIG. 1, according to an example embodiment.

As mentioned above, optical transmitters TX1 and TX2 may modulate respective optical signals LO1 and LO2 using digital modulation, such as BPSK, DP-BPSK, QPSK, QAM, or the like. With reference now to FIGS. 2A-2C, there are shown digital modulation constellations or In-phase (I)-Quadrature (Q) symbol plots for various types of digital modulations, where the vertical and horizontal axes correspond to I and Q axes, respectively. With reference to FIG. 2A, there is shown an example digital modulation constellation 200 for BPSK and DP-BPSK where the second polarization state has an identical constellation. With reference to FIG. 2B, there is shown an example digital modulation constellation 210 for QPSK. With reference to FIG. 2C, there is shown an example digital modulation constellation 220 for 16 QAM.

Optical transceiver 102 is now described in detail. Because optical transceivers 102 and 104 are configured and operate similarly to each other, the ensuing description of optical transceiver 102 and its various components, and the methods implemented therein, shall suffice as a description for optical transceiver 104.

Figure 3:
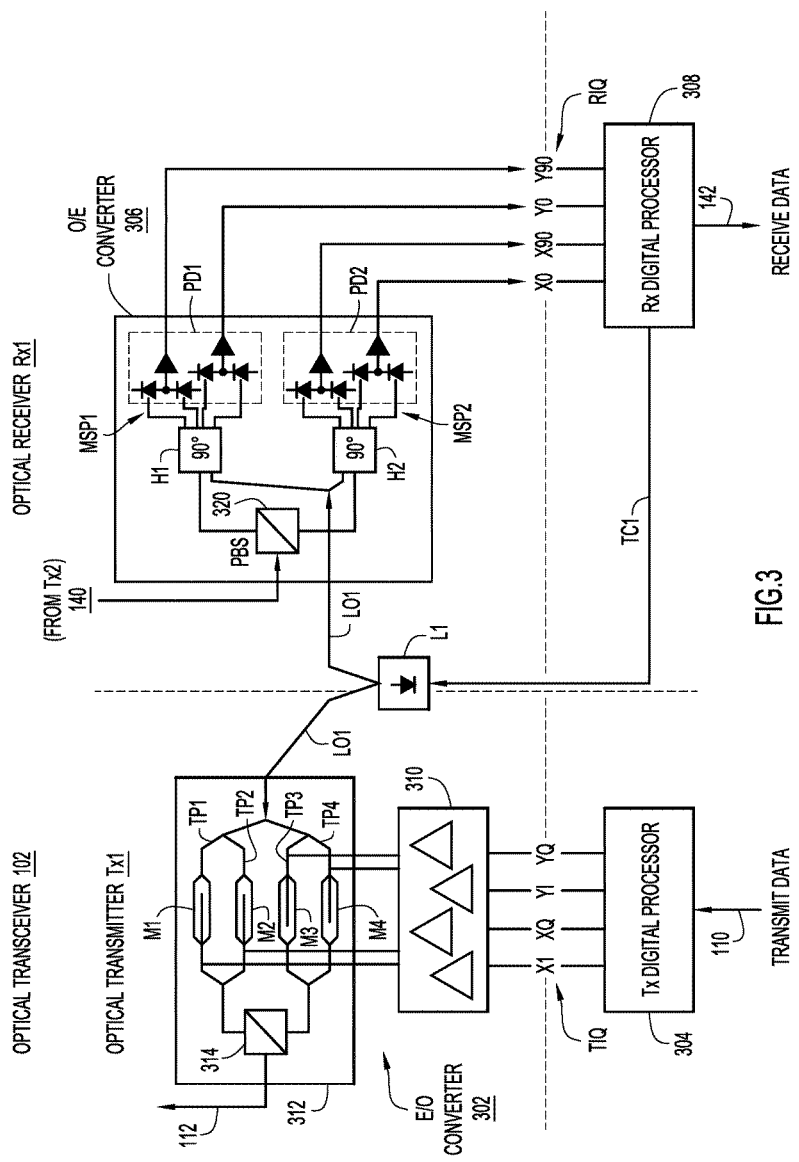
FIG. 3 is a detailed block diagram of the optical transmitter and an optical receiver in the communication system, according to an example embodiment.

With reference to FIG. 3, there is an example detailed block diagram of optical transmitter TX1 and optical receiver RX1 of optical transceiver 102. Optical transmitter TX1 includes (i) an electrical/optical (E/O) converter 302 to convert electrical signals to optical signals, and (ii) a transmitter digital processor 304. Optical receiver RX1 includes (i) an optical/electrical (O/E) converter 306 to convert optical signals to electrical signals, and (ii) a receiver digital processor 308. Digital processors 304 and 308 operate in a digital domain to process digital and/or digitized signals at or near baseband.

Referring first to optical transmitter TX1, transmitter digital processor 304 modulates transmit data 110 to produce a set of I and Q modulation signals or channels XI, XQ, YI, and YQ (indicated collectively at TIQ) representative of a digital modulation constellation, such as any of digital modulation constellations 200, 210, and 220, for example. The "X" and "Y" labels denote different polarization states, e.g., orthogonal polarization states. E/O converter 302 includes amplifiers 310 and an optical modulator 312. Amplifiers 310 amplify respective ones of I and Q modulation signals XI, XQ, YI, and YQ and provide respective amplified versions of the I and Q modulation signals to optical modulator 312. Optical modulator 312 directs optical signal LO1 through parallel optical transmit paths TP1-TP4 each including a respective one of optical modulator devices M1-M4 (e.g., Mach-Zehnder optical modulator devices) that modulates optical signal LO1 in that path responsive to a corresponding one of the respective amplified versions of I and Q modulation signals XI, XQ, YI, and YQ, to thereby produce a respective one of multiple modulated optical signal components. Parallel optical transmit paths TP1-TP4 feed the multiple modulated optical signal components to a polarization beam combiner 314 that combines the components into modulated optical signal 112, which is then transmitted. In an example where optical modulator devices M1-M4 include Mach-Zehnder optical devices, each Mach-Zehnder optical device is incorporated into a bias control loop having a response bandwidth on the order of several hundred KHz.

Optical receiver RX1 is now described. Assuming optical transceiver 102 is not configured for loop-back, O/E converter 306 of optical receiver RX1 receives modulated optical signal 140 from optical transmitter TX2, for example. O/E converter 306 includes a polarization beam splitter (PBS) 320 to direct (received) modulated optical signal 140 to parallel 90° hybrid splitters H1 and H2 each of which also receives optical local oscillator (LO) signal LO1. 90° hybrid splitters H1 and H2 are configured as an optical mixer or frequency down-converter to frequency-mix modulated optical signal 140 with optical signal LO1 and thereby frequency down-convert the modulated optical signal toward baseband, to produce sets of frequency down-converted mixer signal products MSP1 and MSP2. In an example in which optical signal LO1 (in RX1) has a frequency $F_{rx1}$ and optical signal LO2 (in TX2) has a frequency $F_{tx2}$, the frequency down-converted mixer signal products include a frequency difference or offset $F_{tx2rx1} = F_{tx2} - F_{rx1}$.

O/E converter 306 also includes sets of photo-detectors (e.g., PIN/TIA optical detectors) PD1 and PD2 to detect respective ones of the sets of mixer signal products MSP1 and MSP2, to produce a set of detected I and Q signals X0, X90, Y0, and Y90 (collectively indicated at RIQ) representing a detected optical field, and provides the detected I and Q signals X0, X90, Y0, and Y90 to receiver digital processor 308. Photo-detectors PD1 and PD2 are each associated with a control loop response bandwidth of hundreds of KHz. Receiver digital processor 308 recovers receive data 142 from detected I and Q signals X0, X90, Y0, and Y90 and derives control signal TC1 to tune the frequency of optical signal LO1 to achieve the desired LO-signal frequency offset between the frequencies of optical signals LO1 and LO2 (where LO2 was used to generate modulated optical signal 140 in optical transmitter TX2) as discussed briefly above and in further detail below.

Figure 4A:
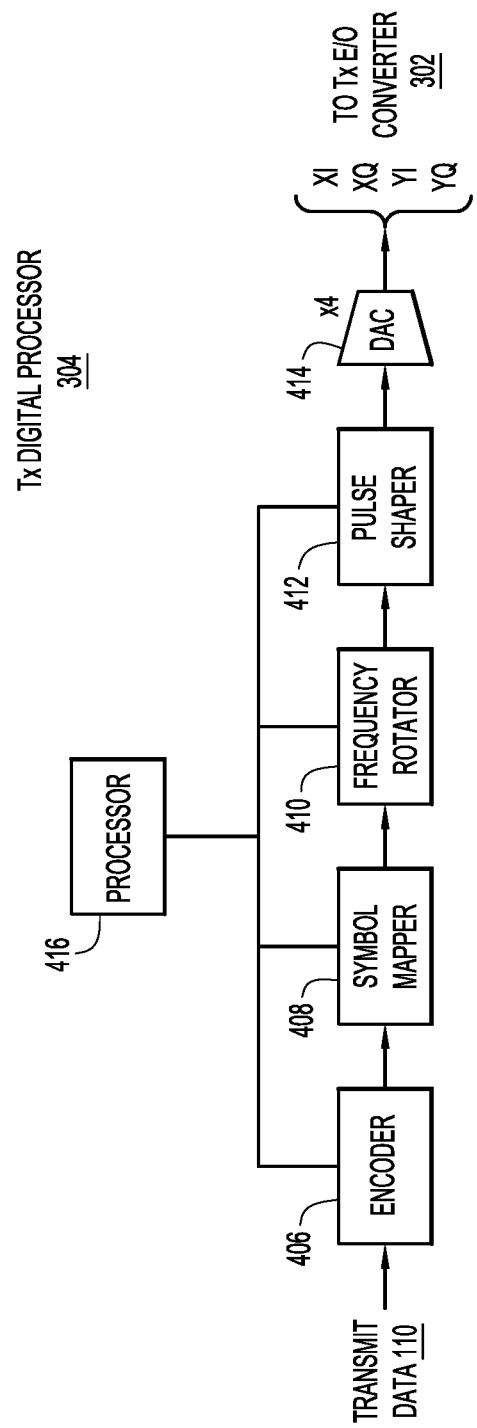
FIG. 4A is a detailed block diagram of a transmitter digital processor of the optical transmitter, according to an embodiment.

With reference to FIG. 4A, there is an example detailed block diagram of transmitter digital processor 304. Techniques implemented in transmitter digital processor 304 may be used in combination with the receiver implemented embodiment, and may also be used in the loop-back embodiment briefly described above in connection with FIG. 1. Transmitter digital processor 304 includes an encoder 406, a symbol mapper 408, a frequency rotator 410, a pulse shaper 412, multiple digital-to-analog converters (DACs) 414 (e.g., 4 DACs), and a processor 416 to control the aforementioned components. Encoder 406 encodes baseband transmit data 110 to produce encoded data. Symbol mapper 408 maps the encoded data to digital modulation symbols that represent a baseband/stationary digital modulation constellation. As part of the loop-back embodiment, frequency rotator 410 adds a small digitally implemented frequency offset or frequency shift to the digital modulation constellation based on an frequency offset control signal from processor 416, which causes the constellation to rotate at a rate equal to the added frequency offset. Pulse shaper 412 pulse shapes the symbols of the rotating digital modulation constellation. DACs 414 convert the pulse-shaped symbols from the digital domain to the analog domain to produce the set of I and Q modulation signals XI, XQ, YI, and YQ as analog (or continuous time) signals representative of the rotating digital modulation constellation, and provide the digitized I and Q modulation signals to E/O converter 302.

Figure 4B:
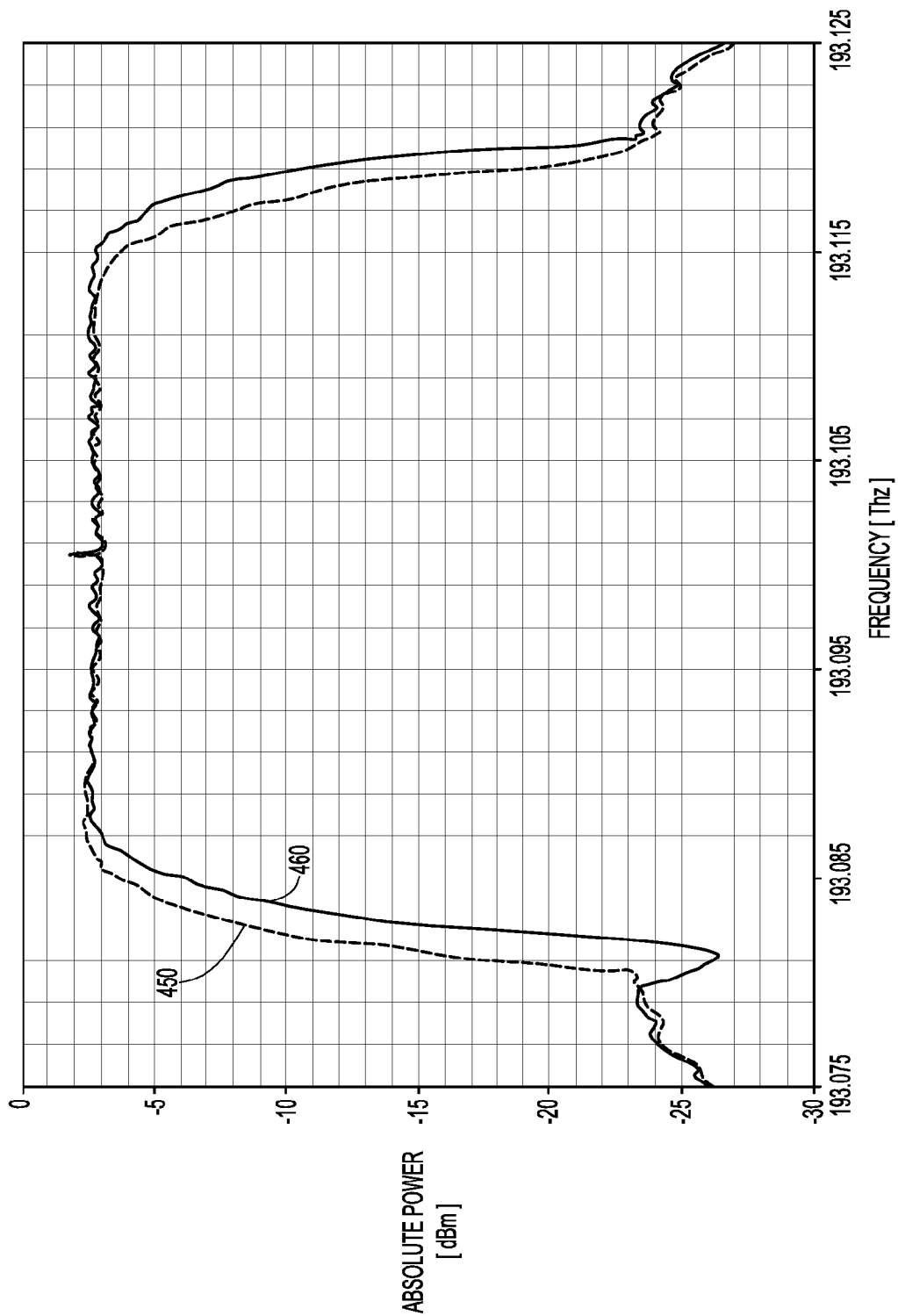
FIG. 4B is a diagram of frequency spectrum plots of a modulated optical signal and a frequency offset modulated optical signal produced by the optical transmitter, according to an example embodiment.

With reference to FIG. 4B, there are shown example frequency spectrum plots of modulated optical signal 112. Frequency spectrum 450 represents modulated optical signal 112 having a modulated signal spectrum centered at the frequency LO1, i.e., without any frequency offset added thereto. On the other hand, frequency spectrum 460 represents modulated optical signal 112 with a frequency offset added thereto via frequency rotator 410, as described above. Note that frequency spectrum plot 460 of FIG. 4B shows an exaggerated LO-signal frequency offset of 1 GHz (1000 MHz) for illustration purposes only, because smaller frequency offsets would not be sufficiently large to show separation between spectrums 450 and 460 given the x-axis frequency scale of the spectrum plots. In practice, a relatively small frequency offset of approximately 7-8 MHz is used such that spectrums 450 and 460 would be separated only by that amount.

The small frequency offset imposed by frequency rotator 410 is greater than (i) the bias control loop bandwidth of several hundred KHz associated with the optical modulator devices M1-M4 and therefore does not interfere with the optical modulation process, and (ii) the control loop response bandwidth of hundreds of KHz associated with photo-detectors PD1 and PD2 and therefore does not interfere with the optical detection processes in the photo-detectors.

Figure 5:
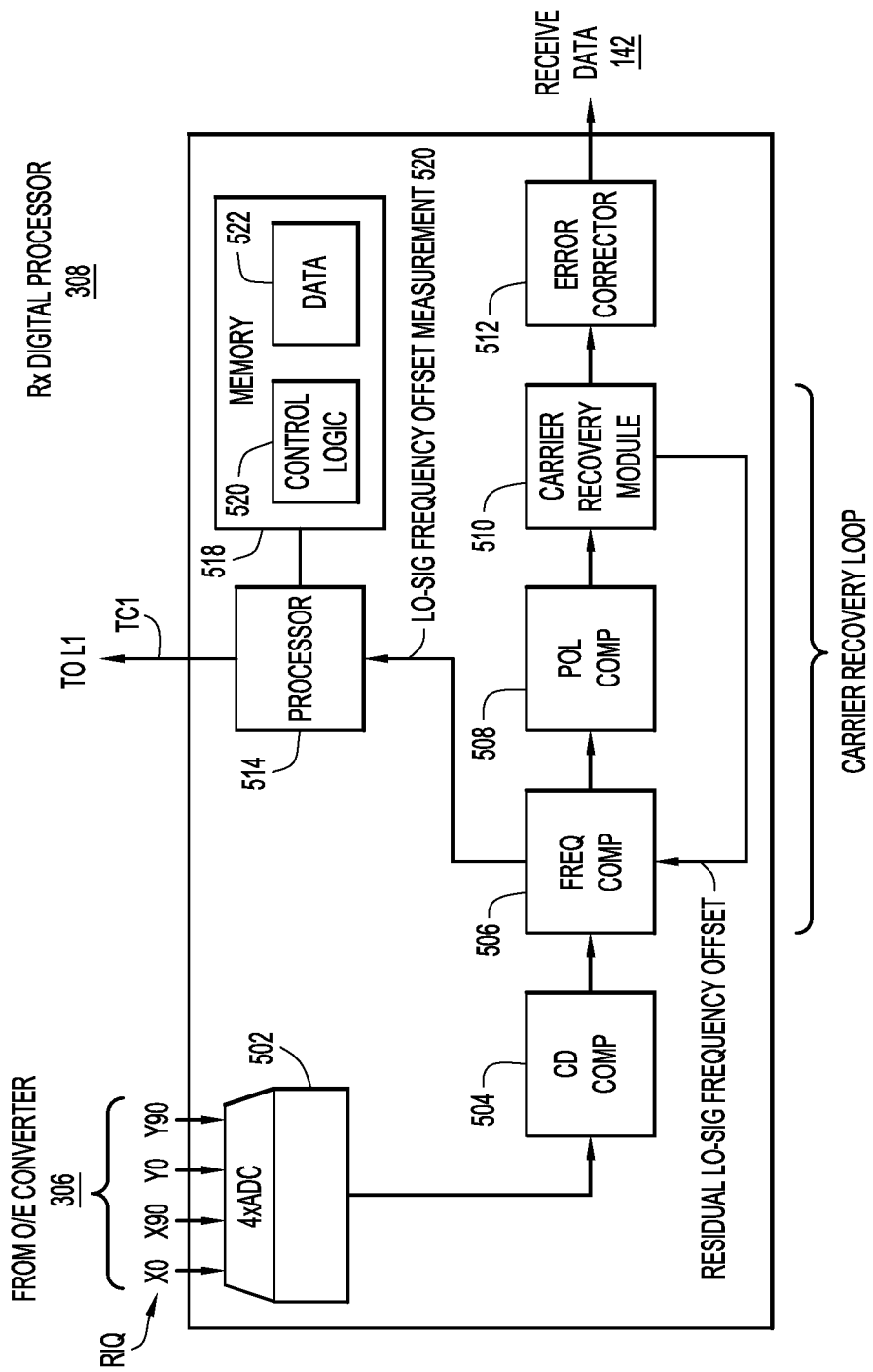
FIG. 5 is a detailed block diagram of a receiver digital processor of the optical receiver, according to an embodiment.

With reference to FIG. 5, there is an example detailed block diagram of receiver digital processor 308. Receiver digital processor 308 recovers receive data 142 from I and Q signals X0, X90, Y0, and Y90 provided by O/E converter 306. Receiver digital processor 308 also derives LO frequency control/tune signal TC1, based on I and Q signals X0, X90, Y0, and Y90, to tune the frequency of optical signal LO1 so as to drive the LO-signal frequency offset between the frequencies of optical signals LO1 and LO2 to one of the target windows, as mentioned briefly above in connection with FIG. 1 and further below. Note that in loop-back, in which optical receiver RX1 receives modulated optical signal 112 from optical transmitter TX1 instead of modulated optical signal 140 from optical transmitter TX2, there is no LO-signal frequency offset between the optical transmitter optical signal used as a carrier (in the optical transmitter) and the optical receiver optical signal used as an LO signal (in the optical receiver); instead there may be only the small LO-signal frequency offset imposed by frequency rotator 410 in optical transmitter TX1 as part of the loop-back embodiment.

Receiver digital processor 308 includes analog-to-digital converters (ADCs) 502 (e.g., 4 ADCs), a chromatic dispersion compensation filter ("CD comp") 504, a frequency compensator (Freq comp") 506, a polarization compensator ("Pol comp") 508, a carrier recovery module 510, a forward error corrector 512, a processor 514 to control the aforementioned components and derive LO frequency control signal TC1, and a memory 518. Memory 518 may comprise one or more tangible computer readable storage media encoded with software comprising computer executable instructions and when the software is executed (by processor 514) it is operable to perform operations described herein. Memory 518 stores control logic 520 to perform methods/operations described herein, including methods to control LO-signal frequency offset described below in connection with FIGS. 7 and 9. Memory 518 also stores data 522 used and generated by logic 520, such as information defining target windows for LO-signal frequency offsets.

ADCs 502 digitize respective ones of I and Q signals X0, X90, Y0, and Y90, and provide the digitized signals to CD comp 504. CD comp 504 processes the digitized I and Q signals to compensate for pulse spread introduced into modulated optical signal 140 in the optical medium (e.g., optical fiber) due to chromatic dispersion. CD comp 504 may include a Finite Impulse Response (FIR) filter implemented in the frequency domain. CD comp 504 provides pulse compensated signals to frequency compensator 506. Frequency compensator 506, polarization compensator 508, and carrier recovery module 510 together implement a carrier recovery loop to determine/measure the LO-signal frequency offset between the frequencies of optical signals LO1 and LO2 (and any additional small LO-signal frequency offset introduce by frequency rotator 410) as represented in I and Q signals X0, X90, Y0, and Y90, and report the determined LO-signal frequency offset (indicated at 520) to processor 514.

More specifically, frequency compensator 506 removes most of the LO-signal frequency offset (e.g., so that only a few MHz residual offset remain) and any additional small frequency offset introduced by frequency rotator 410 based in part on feedback from carrier recovery module 510. Carrier recovery module 510 compensates for/removes any residual LO-signal frequency offset and phase offset remaining after frequency compensator 506, and provides a report of the residual frequency and phase offsets to frequency compensator 506 as the feedback. Frequency compensator 506 reports the LO-signal frequency offset (indicated at 520) to processor 514. Polarization compensator 508 (between frequency compensator 506 and carrier recovery module 510) corrects the polarization state of the received modulated optical signal, so that its X and Y polarization components are correctly separated even though the received modulated optical signal polarization state may be arbitrary. Polarization compensator 508 may include a butterfly structure of FIR filters which may be implemented in the time or frequency domain.

The carrier recovery loop (comprising modules 506, 508, and 510) removes the remaining LO-signal frequency offset, and any phase error, to produce baseband data, and provides the baseband data from carrier recovery module 510 to error corrector 512. Error corrector 512 performs error correction on the baseband data, to produce receive data 142.

According to the receiver implemented embodiment, processor 514 tunes the frequency of optical signal LO1 to ensure a non-zero LO-signal frequency offset exists between the frequencies of optical signals LO1 and LO2 (as manifested at photo-detectors PD1 and PD2). At a high-level, processor 514 defines predetermined non-overlapping target or desired windows that cover desired non-zero ranges of LO-signal frequency offset between the frequencies of optical signals LO1 and LO2. Processor 514 receives LO-signal frequency offset measurement 520. If the LO-signal frequency offset indicated in the measurement 520 is not within one of the target windows, processor 514 derives LO frequency control signal TC1 so as to tune the frequency of optical signal LO1 in a direction that drives the LO-signal frequency offset toward a nearest one of the target windows.

Figure 6:
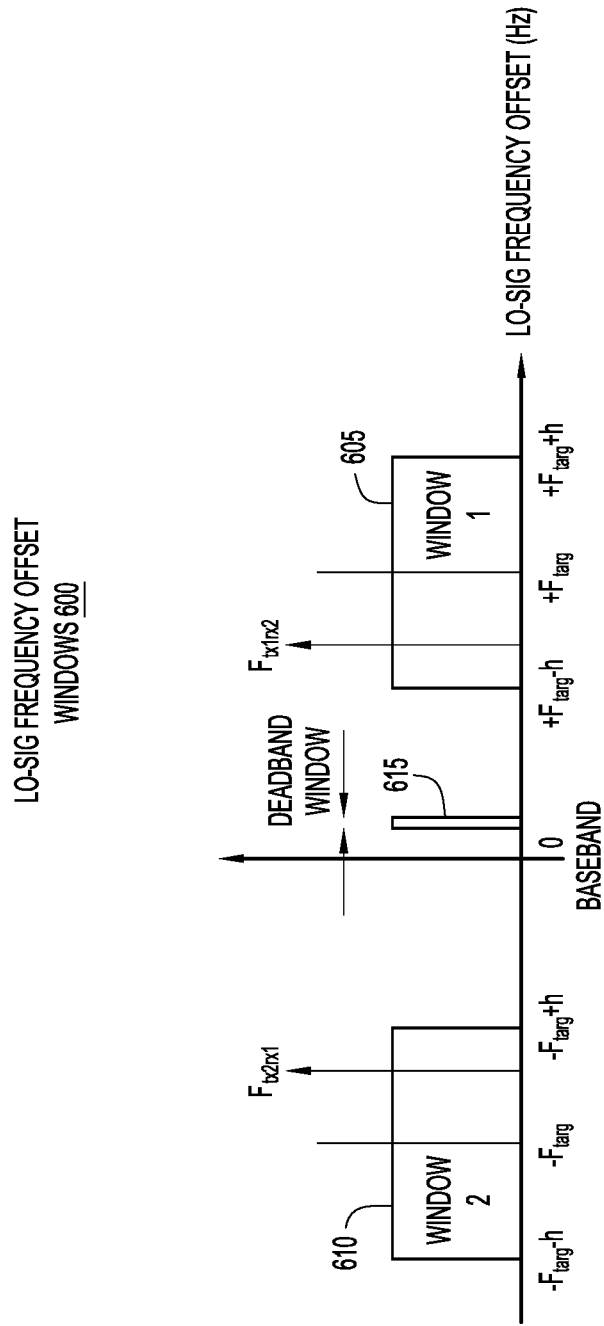
FIG. 6 is a frequency plot of target windows for local oscillator (LO)-signal frequency offset used in methods of controlling LO-signal frequency offset, according to an embodiment.

With reference to FIG. 6, there is a frequency plot 600 that shows example target windows of LO-signal frequency offset 605 and 610. "Positive" target window 605 (also referred to as "window 1") has a frequency width h (i.e., covers a range of frequencies h) that is centered at a target LO-signal frequency offset of $+F_{targ}$ from baseband. "Negative" target window 610 (also referred to as "window 2") has a frequency width h that is centered at a target LO-signal frequency offset of $-F_{targ}$ from baseband. In an example, positive target LO-signal frequency offset $+F_{targ}=+500$ MHz, negative target LO-signal frequency offset $-F_{targ}=-500$ MHz, and frequency width h=200 MHz. Target LO-signal frequency offset $F_{targ}$ may be set based on a baud rate of the transmit data (e.g., transmit data 110). In an example, $F_{targ}=$baud rate/64.

According to the receiver implemented embodiment, assuming optical transmitter TX2 transmits to optical receiver RX1, optical receiver RX1 detects (after mixing) an LO-signal frequency offset $F_{tx2rx1}=F_{tx2}-F_{rx1}$ as indicated on plot 600, where $F_{rx1}$ denotes the frequency of optical signal LO1 and $F_{tx2}$ denotes the frequency of optical signal LO2. Similarly, assuming optical transmitter TX1 transmits to optical receiver RX2, optical receiver RX2 detects (after mixing) an LO-signal frequency offset $F_{tx1rx2}=F_{tx1}-F_{rx2}$ indicated on plot 600, where $F_{tx1}$ denotes the frequency of optical signal LO1 and $F_{rx2}$ denotes the frequency of optical signal LO2. Frequency offsets $F_{tx2rx1}$ and $F_{tx1rx2}$ are equal and opposite, i.e., $F_{tx2rx1}=-F_{tx1rx2}$. If LO-signal frequency offsets $F_{tx2rx1}$ and $F_{tx1rx2}$ fall within respective target windows 610 and 605 as shown in FIG. 6, (i) optical receiver RX1 does not need to tune the frequency of its optical signal LO1 to further adjust LO-signal frequency offset $F_{tx2rx1}$, and (ii) optical receiver RX2 does not need to tune the frequency of its optical signal LO2 to further adjust LO-signal frequency offset $F_{tx1rx2}$. On the other hand, if LO-signal frequency offsets $F_{tx2rx1}$ and $F_{tx1rx2}$ do not fall within respective target windows 610 and 605, optical receivers RX1 and RX2 tune the frequencies of their respective optical signals LO1 and LO2 so as to drive their respective LO-signal frequency offsets $F_{tx2rx1}$ and $F_{tx1rx2}$ toward the nearest window.

In accordance with the loop-back embodiment, frequency plot 600 also includes a dead-band window 615 for the LO-signal frequency offset, where the dead-band window is positioned between target windows 605 and 610. In an example, dead-band window 615 is centered at a small LO-signal frequency offset of +8 MHz, and has a width of 4 MHz, to match the small frequency offset imposed by frequency rotator 410 in a given optical transmitter. Assuming the loop-back arrangement in FIG. 1, the LO-signal frequency offset experienced in optical receiver RX1 is only the small frequency offset imposed by frequency rotator 410, which is sufficient to spread average energy across photodetectors PD1 and PD2. In accordance with the loop-back embodiment, if looped-back optical receiver RX1 detects an LO-signal frequency offset that falls within dead-band window 615, the optical receiver RX1 need not adjust the frequency of optical signal LO1.

Consider an embodiment that combines the receiver implemented embodiment (target windows 605 and 610) and the loop-back embodiment (dead-band window 615). In the combined embodiment, if the optical receiver detects an LO-signal frequency offset that falls within any of windows 605-615, then the optical receiver need not adjust/tune the frequency of its (local) optical signal.

Figure 7:
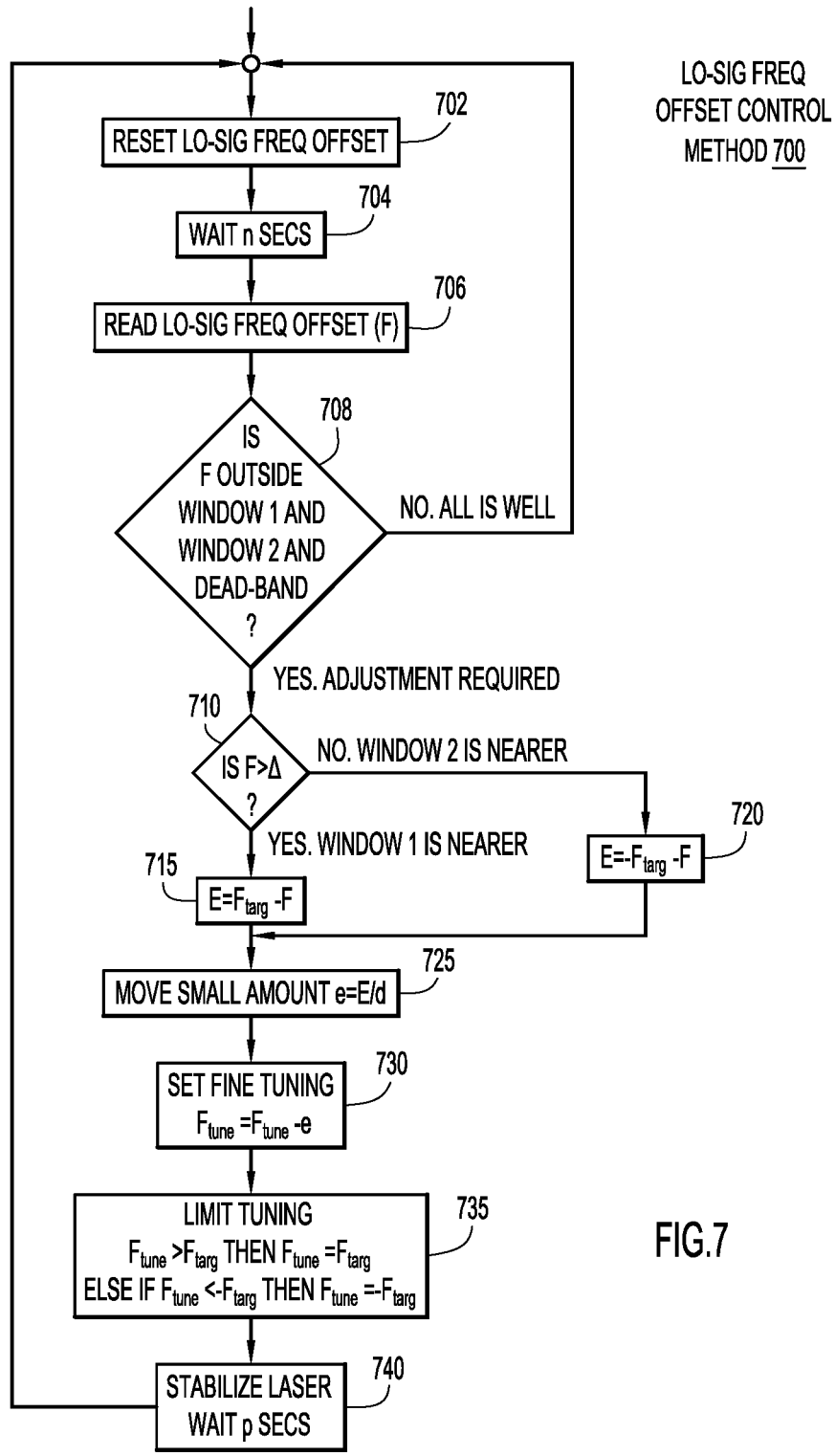
FIG. 7 is a flowchart of a method of controlling an LO-signal frequency offset between a transmit optical frequency used to generate a modulated optical frequency (that is transmitted) and a receive LO frequency using the target windows of FIG. 6 that is performed in the optical receiver of FIG. 3, according to an embodiment.

With reference to FIG. 7, there is a flowchart of an example method 700 of controlling the LO-signal frequency offset between the frequencies of optical signals LO1 and LO2 performed in optical receiver RX1. Method 700 assumes predetermined target windows 605 and 610, and dead-band window 615, have been established and information defining the windows is accessible to processor 514, e.g., is stored in memory 518. Method 700 also assumes optical receiver RX1 receives modulated optical signal 140 from optical transmitter TX2, and processes the (received) modulated optical signal in the manner described above, such that the carrier recovery loop in receiver digital processor 308 determines the LO-signal frequency offset between optical signals LO1 and LO2, denoted "F" in FIG. 7, and reports determined LO-signal frequency offset F to processor 514 via signal 520.

At 702, 704, and 706, processor 514 receives LO-signal frequency offset F (i.e., the determined/measured LO-signal frequency offset). More specifically, in operations 702, 704, and 706, processor 514 clears/resets a previous received LO-signal frequency offset, waits for n seconds (e.g., 0.3 seconds) to allow the frequency of optical signal LO1 to build to an average value, and then reads the value, respectively.

At 708, processor 514 determines whether determined LO-signal frequency offset F is outside of (i.e., not in any of) windows 605, 610 and 615. If F does not fall outside of all of windows 605-619 (i.e., F is in one of the windows), operations 702, 704, and 706 are repeated. If yes (F falls outside of all of windows 605-610), flow continues to 710.

At 710, processor 514 determines whether LO-signal frequency offset F is nearer/closer to positive window 605 or negative window 610. For example, processor 614 determines whether F is greater than a small positive LO-signal frequency offset A, in which case positive window 605 is closer than negative window 610.

If it is determined that positive window 605 is closer, at 715 processor 514 computes a frequency difference or error E between determined LO-signal frequency offset F and the center frequency of the closest target window 605, i.e., $E=F_{targ}-F$. Flow proceeds to 725.

If it is determined that negative window 610 is closer, at 720 processor 514 computes the frequency difference/error E between determined LO-signal frequency offset F and the center frequency of the closest target window 610, i.e., $E=-F_{targ}-F$. Flow proceeds to 725.

At 725, processor 514 computes a small frequency tune amount e by which the frequency of optical signal LO1 should be tuned from its present frequency based on the frequency difference E, where e<E. Any suitable method to compute tune amount e may be used. In an example, tune amount e is chosen as half of the error E to reduce the possibilities of tuning oscillations. Thus, tune amount e is computed according to e=E/d, where d=2. Other values for d may be used.

At 730, processor 514 derives a new frequency $F_{tune}$ for optical signal LO1 based on a previous frequency of the optical signal LO1 and tune amount e. In an example, $F_{tune}=F_{tune}$ (previous)−e.

At 735, processor 514 limits the frequency tuning so that the frequency tuning does not drive the frequency of optical signal LO1 past either of target LO-signal frequency offsets+/−$F_{targ}$. Thus: if $F_{tune}>F_{targ}$, then $F_{tune}=F_{targ}$; or if $F_{tune}<-F_{targ}$, then $F_{tune}=-F_{targ}$. Operation 735 is optional, as LO-signal frequency offsets>$F_{targ}$ are acceptable. Processor 514 derives frequency control signal TC1 to tune the frequency of optical signal LO1 to $F_{tune}$, as determined at operations 730 and 735.

At 740, processor 514 waits p seconds (e.g. 5 seconds) for the tuned frequency of optical signal LO1 to settle to the new tuned value, and flow returns to 702.

In the ensuing description, the term "signal" may be referred to as "frequency." Thus, optical signal LO1, optical signal LO2, and modulated optical signal 112/140, may be referred to as optical frequency LO1, optical frequency LO2, and modulated optical frequency 112/140, respectively. Moreover, when referenced in connection with optical receivers RX1 and RX2, optical signal (or frequency) LO1 and optical signal (or frequency) LO2 may also be referred to more specifically as "optical LO signal (or frequency) LO1" and optical LO signal (or frequency) LO2 because those optical signals (or frequencies) are used as LO signals (or frequencies) in the optical receivers.

Figure 8:
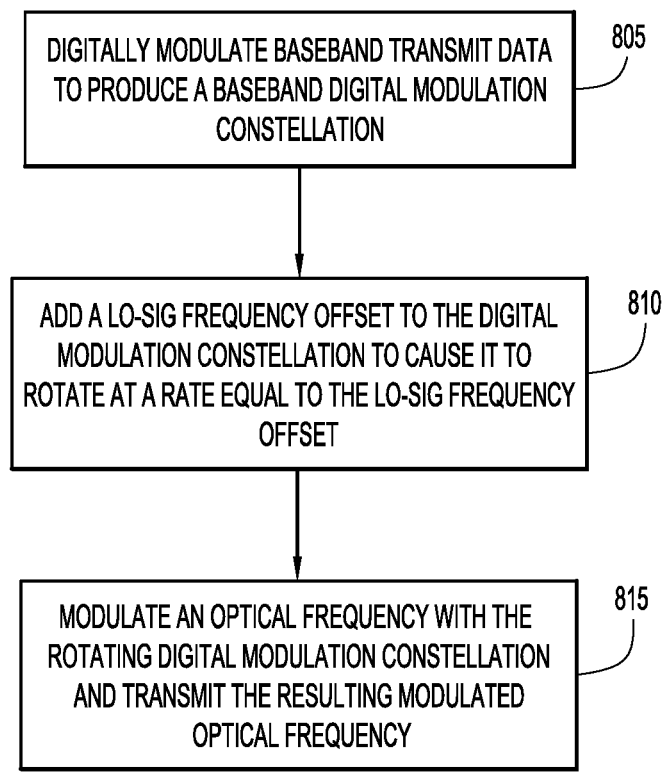
FIG. 8 is a flowchart of a transmit method of generating a modulated optical signal with an LO-signal frequency offset performed in the optical transmitter, according to an embodiment.

With reference to FIG. 8, there is a flowchart of an example transmit method 800 of generating modulated optical frequency 112 performed in optical transmitter TX1.

At 805, transmitter digital processor 304 digitally modulates baseband transmit data 110 to produce a baseband, i.e., stationary, digital modulation constellation. In an example, to digitally modulate the baseband transmit data, digital processor 304 maps the baseband transmit data to modulation symbols representative of the digital modulation constellation.

At 810, transmitter digital processor 304 adds a small digital frequency offset to the digital modulation constellation to cause it to rotate at a rate equal to the added frequency offset. This generates optical modulation signals TIQ representative of the rotating digital modulation constellation.

At 815, E/O converter 302 modulates optical frequency LO1 with optical modulation signal TIQ, to produce optical modulated frequency 112. Optical transmitter TX1 transmits modulated optical frequency 112.

In the loop-back arrangement, optical transmitter TX1 transmits modulated optical frequency 112 to optical receiver RX1, which receives and processes the modulated optical frequency in accordance with method 700. In method 700, because the same optical frequency, LO1, is used in optical transmitter TX1 (as an optical carrier) and optical receiver RX1 (as an LO signal), optical receiver RX1 will detect only the small LO-signal frequency offset imposed by optical transmitter TX1. That small LO-signal frequency offset falls into dead-band window 615 (which spans expected frequency offsets imparted by frequency rotator 410) and, therefore, optical receiver RX1 will not tune, i.e., change, the frequency of optical LO frequency LO1.

Figure 9:
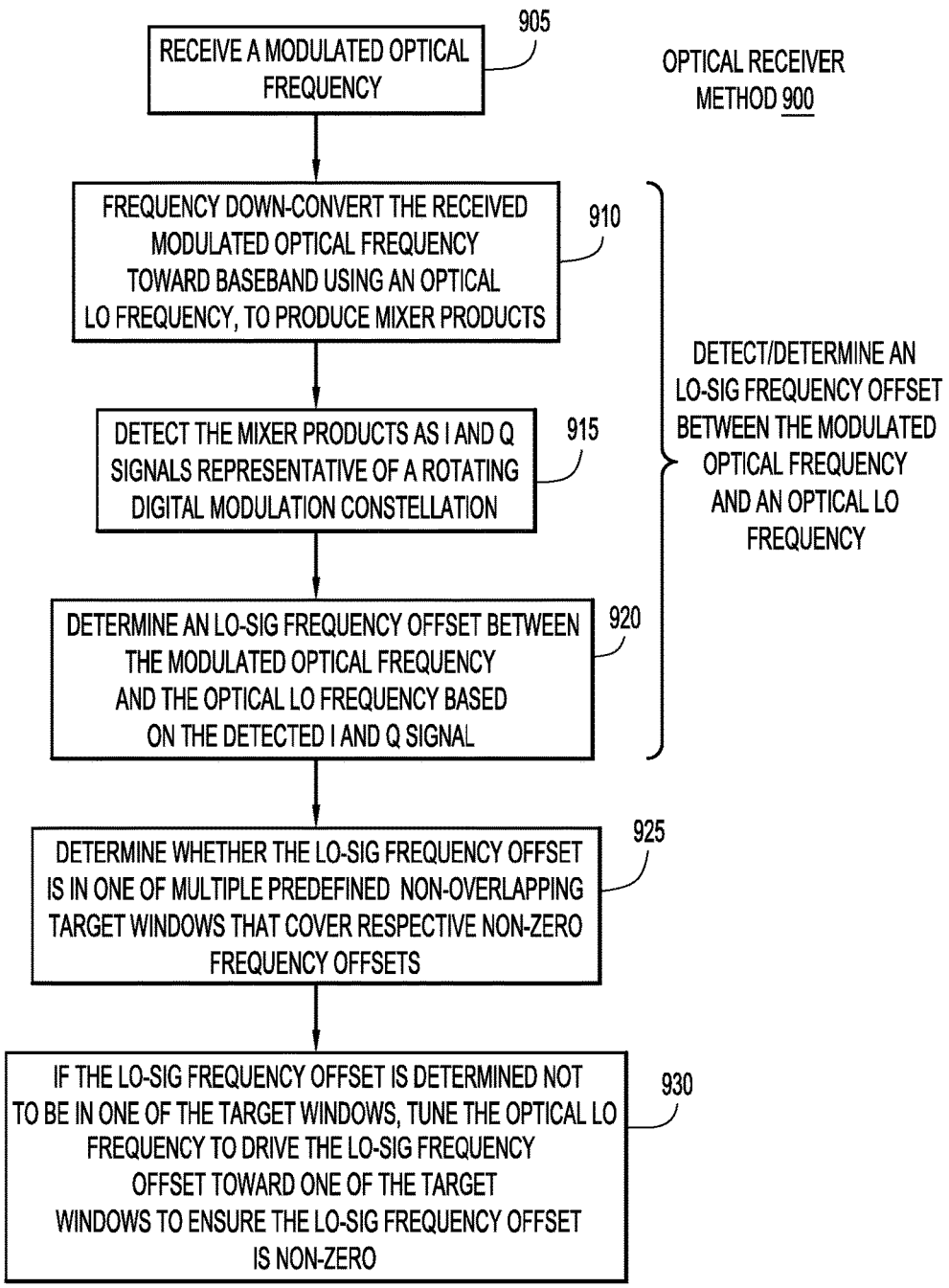
FIG. 9 is a flowchart of a receive method of controlling an LO-signal frequency offset performed in the optical receiver, according to an embodiment.

With reference to FIG. 9, there is a flowchart of an example receive method 900 of controlling an LO-signal frequency offset between optical LO frequency LO1 (used as an LO signal in optical receiver RX1) and optical frequency LO2 (modulated by baseband data in optical transmitter TX2) performed in optical receiver RX1.

At 905, O/E converter 306 receives modulated optical frequency 140 from optical transmitter TX2. Modulated optical frequency 140 is representative of optical frequency LO2 that was modulated to generate modulated optical frequency 112. In other words, optical frequency LO2 is an optical carrier for modulation.

Next operations 910-920 collectively detect/determine the LO-signal frequency offset between modulated optical frequency 140 and optical LO frequency LO1. This may be an average LO-signal frequency offset that corresponds to a difference between an average center frequency of modulated optical frequency 140 (and thus the average center frequency of optical frequency LO2) and an average center frequency of optical LO frequency LO1.

At 910, O/E converter 306 frequency mixes modulated optical frequency 140 with optical LO frequency LO1 to frequency down-convert the modulated optical frequency toward baseband, to produce frequency down-converted mixer signal products.

At 915, O/E converter 306 detects the mixer signal products to produce at or near baseband I and Q signals. The detected I and Q signals represent a digital modulation constellation rotating at a rate equal to an LO-signal frequency offset between optical LO frequency LO1 and modulated optical frequency 140 (and more specifically, the LO-signal frequency offset between optical LO frequency LO1 and optical frequency LO2).

At 920, receiver digital processor 308 determines the LO-signal frequency offset based on the detected I and Q signals.

At 925, receiver digital processor 308 determines whether the LO-signal frequency offset is in one of multiple predefined non-overlapping target windows 605 or 610 (or 615 in another embodiment) that cover respective non-zero LO-signal frequency offsets.

At 930, if the LO-signal frequency offset is determined not to be in one of the target windows, receiver digital processor 308 tunes optical LO frequency LO1 to drive the LO-signal frequency offset toward one of the target windows to ensure the LO-signal frequency offset is non-zero. Otherwise, if the optical LO-signal frequency offset is determined to be in one of the target windows, digital processor 308 does not adjust/tune the optical LO frequency, i.e., the processor maintains the current optical LO frequency LO1 so that the LO-signal frequency offset remains within the one of the target windows.

Optical receiver RX1 repeats method 900 over time.

Features of the different embodiments described above, including the receiver implemented embodiment and the loop-back embodiment, may be implemented independent of one another or may be combined. For example, methods 700 and 900 may use only two target windows 605 and 610 or, alternatively, all three windows 605-615. Also, a given optical transmitter in communication with a given optical receiver may implement the digital rotation described above, or may not implement the digital rotation. Other combinations of features are possible.

Embodiments presented herein provide a simple method for obtaining good performance with digital modulation techniques, such as DP-BPSK or other transmission formats where near zero LO-signal frequency offsets are problematic. Removes performance impact of near zero LO-signal frequency offsets. The embodiments are straight-forward to implement and compatible with low-cost systems where a single laser is used for both the optical transmitter and the optical receiver. The embodiments may be conveniently retrofitted into existing systems that use conventional DP-BPSK modulation formats and Mach-Zehnder control loops for QPSK/16-QAM.

In summary, in one form, a system is provided comprising: a laser configured to generate a tunable optical frequency; an optical transmitter configured to: map baseband data to symbols represented in a digital modulation constellation; add a frequency offset to the digital modulation constellation to cause the digital modulation constellation to rotate at a rate equal to the added frequency offset; and modulate the optical frequency with the rotating digital modulation constellation and transmit the resulting modulated optical frequency; and an optical receiver configured to: receive the transmitted modulated optical frequency; and using the tunable optical frequency, detect the rotating digital modulation constellation conveyed by the received modulated optical frequency.

In another form, a method is provided comprising: generating a tunable optical frequency; at an optical transmitter: mapping baseband data to symbols represented in a digital modulation constellation; adding a frequency offset to the digital modulation constellation to cause the digital modulation constellation to rotate at a rate equal to the added frequency offset; and modulating the optical frequency with the rotating digital modulation constellation and transmit the resulting modulated optical frequency; and at an optical receiver: receiving the transmitted modulated optical frequency; and using the tunable optical frequency, detecting the rotating digital modulation constellation conveyed by the received modulated optical frequency.

In yet another form, a system is provided comprising: a laser configured to generate a tunable optical frequency; an optical transmitter including: a symbol mapper to map baseband data to symbols represented in a digital modulation constellation; a frequency rotator to add a frequency offset to the digital modulation constellation to cause the digital modulation constellation to rotate at a rate equal to the added frequency offset; and an electrical/optical (E/O) converter including optical modulator devices to modulate the optical frequency with the rotating digital modulation constellation and transmit the resulting modulated optical frequency; and an optical receiver configured to: receive the transmitted modulated optical frequency; and using the tunable optical frequency, detect the rotating digital modulation constellation conveyed by the received modulated optical frequency.

The above description is intended by way of example only. Various modifications and structural changes may be made therein without departing from the scope of the concepts described herein and within the scope and range of equivalents of the claims.

What is claimed is:

1. A system comprising:
a laser configured to generate a tunable optical frequency;
an optical transmitter configured to:
  map baseband data to symbols represented in a digital modulation constellation;
  add a frequency offset to the digital modulation constellation to cause the digital modulation constellation to rotate at a rate equal to the added frequency offset; and
  modulate the optical frequency with the rotating digital modulation constellation and transmit the resulting modulated optical frequency; and
an optical receiver configured to:
  receive the transmitted modulated optical frequency; and
  using the tunable optical frequency, detect the rotating digital modulation constellation conveyed by the received modulated optical frequency.

2. The system of claim 1, wherein the optical receiver is configured to detect by:
frequency down-converting the received modulated optical frequency toward baseband using the tunable optical frequency; and
detecting in-phase (I) and quadrature (Q) signals representative of the rotating digital modulation constellation from the frequency down-converted received modulated optical signal.

3. The system of claim 2, wherein the optical receiver is further configured to remove the frequency offset from the rotating modulation constellation based on the detected I and Q signals, to produce a stationary digital modulation constellation, and recover the baseband data from the stationary modulation constellation.

4. The system of claim 1, wherein the optical receiver is further configured to:
detect the frequency offset based on the rotating digital modulation constellation;
determine whether the frequency offset is in a predefined dead-band window that covers a range of non-zero frequency offsets; and
if the frequency offset is determined to be in the dead-band window, maintain the tunable optical frequency so that the frequency offset remains in the dead-band window.

5. The system of claim 1, wherein the modulation constellation is a dual-polarization binary phase shift keying (DP-BPSK) modulation constellation.

6. The system of claim 1, wherein the optical receiver is further configured to:
detect the frequency offset based on the rotating digital modulation constellation;
determine whether the frequency offset is in one of multiple predefined non-overlapping target windows that cover respective non-zero frequency offsets; and
if the frequency offset is determined not to be in one of the target windows, tune the tunable optical frequency to drive the frequency offset toward one of the target windows to ensure the frequency offset is non-zero.

7. The system of claim 6, wherein the target windows include a positive target window centered at a positive target frequency offset from baseband and a negative target window centered at a negative target frequency offset from baseband.

8. The system of claim 7, wherein the target windows further include a dead-band window centered at a dead-band target frequency offset between baseband and the positive target window.

9. The system of claim 6, wherein the optical receiver is further configured to determine which of the target windows is nearest the frequency offset, wherein the optical receiver is configured to tune by tuning the tunable optical frequency to drive the frequency offset toward the target window determined to be nearest the frequency offset.

10. The system of claim 9, wherein the optical receiver is further configured to tune by tuning the tunable optical frequency to drive the frequency offset toward the determined nearest target window such that the frequency offset resulting from the tuning does not exceed the target frequency offset from baseband at which the determined nearest target window is centered.

11. A method comprising:
generating a tunable optical frequency;
at an optical transmitter:
  mapping baseband data to symbols represented in a digital modulation constellation;
  adding a frequency offset to the digital modulation constellation to cause the digital modulation constellation to rotate at a rate equal to the added frequency offset; and
  modulating the optical frequency with the rotating digital modulation constellation and transmit the resulting modulated optical frequency; and
at an optical receiver:
  receiving the transmitted modulated optical frequency; and
  using the tunable optical frequency, detecting the rotating digital modulation constellation conveyed by the received modulated optical frequency.

12. The method of claim 11, wherein the detecting at the optical receiver includes:
frequency down-converting the received modulated optical frequency toward baseband using the tunable optical frequency; and
detecting in-phase (I) and quadrature (Q) signals representative of the rotating digital modulation constellation from the frequency down-converted modulated optical signal.

13. The method of claim 12, further comprising, at the optical receiver, removing the frequency offset from the rotating modulation constellation based on the detected I and Q signals, to produce a stationary digital modulation constellation, and recovering the baseband data from the stationary modulation constellation.

14. The method of claim 11, further comprising, at the optical receiver:
   detecting the frequency offset based on the rotating digital modulation constellation;
   determining whether the frequency offset is in a predefined dead-band window that covers a range of non-zero frequency offsets; and
   if the frequency offset is determined to be in the dead-band window, maintaining the tunable optical frequency so that the frequency offset remains in the dead-band window.

15. The method of claim 11, wherein the modulation constellation is a dual-polarization binary phase shift keying (DP-BPSK) modulation constellation.

16. The method of claim 11, further comprising at the optical receiver:
   detecting the frequency offset based on the rotating digital modulation constellation;
   determining whether the frequency offset is in one of multiple predefined non-overlapping target windows that cover respective non-zero frequency offsets; and
   if the frequency offset is determined not to be in one of the target windows, tuning the tunable optical frequency to drive the frequency offset toward one of the target windows to ensure the frequency offset is non-zero.

17. The method of claim 16, wherein the target windows include a positive target window centered at a positive target frequency offset from baseband and a negative target window centered at a negative target frequency offset from baseband.

18. A system comprising:
   a laser configured to generate a tunable optical frequency;
   an optical transmitter including:
      a symbol mapper to map baseband data to symbols represented in a digital modulation constellation;
      a frequency rotator to add a frequency offset to the digital modulation constellation to cause the digital modulation constellation to rotate at a rate equal to the added frequency offset; and
      an electrical/optical (E/O) converter including optical modulator devices to modulate the optical frequency with the rotating digital modulation constellation and transmit the resulting modulated optical frequency; and
   an optical receiver configured to:
      receive the transmitted modulated optical frequency; and
      using the tunable optical frequency, detect the rotating digital modulation constellation conveyed by the received modulated optical frequency.

19. The system of claim 18, wherein the optical receiver includes:
   an optical/electrical (O/E) converter to frequency down-convert the received modulated optical frequency toward baseband using the tunable optical frequency and digitize the frequency down-converted signal to produce a digitized frequency down-converted signal; and
   a digital processor to detect in-phase (I) and quadrature (Q) signals representative of the rotating digital modulation constellation from the digitized frequency down-converted signal.

20. The system of claim 19, wherein the digital processor of the optical receiver is configured to:
   detect the frequency offset based on the rotating digital modulation constellation;
   determine whether the frequency offset is in a predefined dead-band window that covers a range of non-zero frequency offsets; and
   if the frequency offset is determined to be in the dead-band window, maintain the tunable optical frequency so that the frequency offset remains in the dead-band window.

* * * * *